United States Patent
Fischer et al.

(10) Patent No.: US 8,163,831 B2
(45) Date of Patent: *Apr. 24, 2012

(54) THERMOSETS CONTAINING CARBON NANOTUBES BY EXTRUSION

(75) Inventors: Alan Fischer, Cambridge, MA (US); Timothy Jozokos, Pelham, NH (US); James Leacock, Boston, MA (US); Andrew Rich, Hanover, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,095

(22) Filed: Feb. 8, 2011

(65) Prior Publication Data

US 2011/0133133 A1 Jun. 9, 2011
US 2012/0061621 A9 Mar. 15, 2012

Related U.S. Application Data

(63) Continuation of application No. 11/841,596, filed on Aug. 20, 2007, now Pat. No. 7,910,650, which is a continuation of application No. 11/218,209, filed on Aug. 31, 2005, now Pat. No. 7,566,749.

(60) Provisional application No. 60/605,769, filed on Aug. 31, 2004.

(51) Int. Cl.
*C08K 3/04* (2006.01)
(52) U.S. Cl. .................................. 524/495; 524/496
(58) Field of Classification Search .............. 524/495, 524/496
See application file for complete search history.

(56) References Cited

U.S. PATENT DOCUMENTS

| | | | |
|---|---|---|---|
| 4,663,230 A | 5/1987 | Tennent | |
| 4,855,091 A | 8/1989 | Geus et al. | |
| 5,110,693 A | 5/1992 | Friend et al. | |
| 5,165,909 A | 11/1992 | Tennent et al. | |
| 5,171,560 A | 12/1992 | Tennent | |
| 5,346,683 A | 9/1994 | Green et al. | |
| 5,424,054 A | 6/1995 | Bethune et al. | |
| 5,456,897 A | 10/1995 | Moy et al. | |
| 5,500,200 A | 3/1996 | Mandeville et al. | |
| 5,569,635 A | 10/1996 | Moy et al. | |
| 5,591,382 A | 1/1997 | Nahass et al. | |
| 5,641,466 A | 6/1997 | Ebbesen et al. | |
| 5,707,916 A | 1/1998 | Snyder et al. | |
| 5,965,470 A | 10/1999 | Bening et al. | |
| 6,031,711 A | 2/2000 | Tennent et al. | |
| 6,099,960 A | 8/2000 | Tennent et al. | |
| 6,099,965 A | 8/2000 | Tennent et al. | |
| 6,143,689 A | 11/2000 | Moy et al. | |
| 6,203,814 B1 | 3/2001 | Fisher et al. | |
| 6,221,330 B1 | 4/2001 | Moy et al. | |
| 6,528,572 B1 | 3/2003 | Patel et al. | |
| 6,689,835 B2 | 2/2004 | Amarasekera et al. | |
| 6,696,387 B1 | 2/2004 | Moy et al. | |
| 7,566,749 B2 * | 7/2009 | Fischer et al. | 524/496 |
| 7,910,650 B2 * | 3/2011 | Fischer et al. | 524/495 |
| 2004/0071990 A1 | 4/2004 | Moriyama et al. | |
| 2004/0122153 A1 | 6/2004 | Guo et al. | |
| 2004/0202603 A1 | 10/2004 | Fischer et al. | |
| 2005/0002850 A1 | 1/2005 | Niu et al. | |
| 2005/0171270 A1 | 8/2005 | Noguchi et al. | |
| 2006/0293434 A1 | 12/2006 | Yodh et al. | |
| 2007/0213450 A1 | 9/2007 | Winey et al. | |

FOREIGN PATENT DOCUMENTS

| | | |
|---|---|---|
| JP | 2004075706 A | 3/2004 |
| JP | 2005-350497 A | 12/2005 |
| JP | 2006057057 A | 3/2006 |
| WO | 8907163 A1 | 8/1989 |
| WO | 9103057 A1 | 3/1991 |
| WO | 9105089 A1 | 4/1991 |
| WO | 9507316 A1 | 3/1995 |
| WO | 03014209 A1 | 2/2003 |
| WO | 03079472 A2 | 9/2003 |
| WO | 03080513 A2 | 10/2003 |
| WO | 03085681 A1 | 10/2003 |

OTHER PUBLICATIONS

Ajayan and Iijima, "Capillarity-induced filling of carbon nanotubes," Nature 361, p. 334-337 (1993).
Baker and Harris, Chemistry and Physics of Carbon, Walker and Thrower ed., vol. 14, 1978, p. 83.
Bening and McCarthy, "Surface Chemistry of Fibrillar Carbon," Polymer Preprints ACS Div. of Polymer Chem., 30 (1), p. 420 (1990).
Bethune, D S, et al., "Cobalt-catalysed Growth of Carbon Nanotubes With Single-Atomic-Layer Walls," Nature, vol.363, p. 605-607 (1993).
Chen, Haddon and associates, "Chemical attachment of organic functional groups to single-walled carbon nanotube material," J. Mater. Res., vol. 13, No. 9, 2423 (1998).
Chen, Haddon and his associates; "Solution Properties of Single-Walled Carbon Nanotubes" Science, 282, 95 (1998).
Dai, H., et al., "Single-Wall Nanotubes Produced by Metal-Catalyzed Disproportionation of Carbon Monoxide," Chemical Physics Letters 260: 471-475 (1996).

(Continued)

Primary Examiner — Edward Cain

(57) ABSTRACT

Methods of preparing conductive thermoset precursors containing carbon nanotubes is provided. Also provided is a method of preparing conductive thermosets containing carbon nanotubes. The carbon nanotubes may in individual form or in the form of aggregates having a macromorpology resembling the shape of a cotton candy, bird nest, combed yarn or open net. Preferred multiwalled carbon nanotubes have diameters no greater than 1 micron and preferred single walled carbon nanotubes have diameters less than 5 nm. Carbon nanotubes may be adequately dispersed in a thermoset precursor by using a extrusion process generally reserved for thermoplastics. The thermoset precursor may be a precursor for epoxy, phenolic, polyimide, urethane, polyester, vinyl ester or silicone. A preferred thermoset precursor is a bisphenol A derivative.

11 Claims, No Drawings

OTHER PUBLICATIONS

Guo, T., et al., "Catalytic growth of single-walled nanotubes by laser vaporization," Chem. Phys. Lett., vol. 243: Issues 1-2, pp. 49-54 (1995).

Hoogenvaad, M.S., et al., "Metal Catalysts supported on a Novel Carbon Support," Preparation of Catalysts VI, (G. Poncelet et al. Editors), 1995, pp. 263-271.

Iijima, S., "Helical microtubules of graphitic carbon," Nature 354:56-58 (1991).

Iijima, S. and Ichihashi,T., "Single-shell carbon nanotubes of 1-nm diameter," Nature, vol.363, pp. 603-605 (1993).

Rodriguez, N., "A Review of Catalytically Grown Carbon Nanofibers," J. Mater. Research, vol. 8, pp. 3233-3250 (1993).

Thess, A., et al., "Crystalline Ropes of Metallic Carbon Nanotubes," Science, 273:483-487 (1996).

Weaver, J.H., "Totally Tubular," Science 265 pp. 611-612 (1994).

Wender and P. Pino, eds., "Organic Syntheses via Metal Carbonyls," vol. 1, Interscience Publishers, New York, 1968, p. 40.

* cited by examiner

THERMOSETS CONTAINING CARBON NANOTUBES BY EXTRUSION

CROSS REFERENCE INFORMATION

This is a continuation of U.S. Ser. No. 11/841,596 filed Aug. 20, 2007 now U.S. Pat. No. 7,910,650, which is a continuation of U.S. Ser. No. 11/218,209 filed Aug. 31, 2005, which issued as U.S. Pat. No. 7,566,749, which claims priority to and the benefit of U.S. Provisional Application Ser. No. 60/605,769, filed Aug. 31, 2004, all of which are hereby incorporated by reference.

BACKGROUND OF THE INVENTION

1. Field of Invention

The invention relates broadly to conductive thermosets and conductive thermoset precursors containing carbon nanotubes. The conductive thermoset precursors are prepared by extrusion and are used to prepare the conductive thermosets.

2. Description of the Related Art

Conductive Polymers

Conductive polymers have long been in demand and offer a number of benefits for a variety of applications due to their combined polymeric and conductive properties. The polymeric ingredient in conductive polymers can take the form of thermoplastics or thermosets. General background information on these polymers may be found in numerous publications such as *International Plastics Handbook*, translated by John Haim and David Hyatt, $3^{rd}$ edition, Hanser/Gardner Publications (1995) and *Mixing and Compounding of Polymers—Theory and Practice*, edited by Ica Manas-Zloczower and Zehev Tadmor, Hanser/Gardner Publications (1994), both of which are hereby incorporated by reference. The conductive element of the conductive polymer includes metallic powder or carbon black.

Thermoplastics, by their malleable and flexible nature, have proven to be more commercially practical and viable when forming conductive polymers. E.g., U.S. Pat. No. 5,591,382, filed Mar. 30, 1994 to Nahass, et al., hereby incorporated by reference. Thermoplastics are easy to mix with conductive additives by an extrusion process to form a conductive thermoplastic polymer. Furthermore, thermoplastics can be softened upon heating so as to reshape the thermoplastic as necessary. However, thermoplastics lack the strength of thermosets, which crosslink to form stronger polymers. Recent technological developments permit the addition of cross linking agents to thermoplastics to endow the thermoplastic with greater strength, although such process has its own disadvantages as well (e.g., extra cost, effort, experimentation, etc.)

On the other hand, thermosets, which are more rigid and inflexible in nature, are difficult to mix with conductive additives to form a conductive thermoset polymer. Unlike thermoplastics, thermoset polymers are typically formed through a chemical reaction with at least two separate components or precursors. The chemical reaction may include use of catalysts, chemicals, energy, heat, or radiation so as to foster intermolecular bonding such as crosslinking. Different thermosets can be formed with different reactions to foster intermolecular bonding. The thermoset bonding/forming process is often referred to as curing. The thermoset components or precursors are usually liquid or malleable prior to curing, and are designed to be molded into their final form, or used as adhesive. Once cured, however, a thermoset polymer is stronger than thermoplastic and is also better suited for high temperature applications since it cannot be easily softened, remelted, or remolded on heating like thermoplastics. Thus, conductive thermoset polymers offer the industry a much desired combination of strength and conductivity.

Unlike thermoplastics which can be melted so as to add and disperse conductive additives via extrusion, thermosets cannot be melted once the thermoset has been cured. Rather, conductive additives must be added and dispersed into the precursor components before the final cured thermoset product is formed. This requirement creates a number of limitations in forming conductive thermosets. For example, extrusion, which is a preferred and efficient method for dispersing additives in thermoplastics, is generally not used with thermoset precursors since they typically do not have sufficient viscosity to permit the successful dispersion of the conductive additives in the precursors.

Rather, sonication, stirring or milling are the preferred methods to disperse conductive additives in thermosets. However, these methods are difficult to scale up for commercial uses, and have not yielded consistent and practical results in forming conductive thermoset polymers. For example, when forming conductive thermoset, typically a conductive additive is mixed into a first liquid precursor and stirred therein. However, adding a conductive additive increases the viscosity of the first liquid precursor and thus increases the difficulty in mixing. Therefore, there is an inherent limit as to how much conductive additive can be practically added to the first liquid precursor. The mixed first liquid precursor is then added to and reacted with a second liquid precursor of lower viscosity (if the second liquid precursor was of higher viscosity, mixing would be even more difficult) to form the thermoset polymer or resin. However, by mixing the first mixed precursor with the second liquid precursor, the total conductive additive loading is further decreased with respect to the final thermoset product, usually rendering the final conductive thermoset product commercially nonviable.

As such, there is a need for a new method for forming conductive thermosets.

Carbon Nanotubes

There are a number of known conductive additives in the art, including carbon black, carbon fibers, carbon fibrils, metallic powder, etc. Carbon fibrils have grown in popularity due to its extremely high conductivity and strength compared to other conductive additives.

Carbon fibrils are commonly referred to as carbon nanotubes. Carbon fibrils are vermicular carbon deposits having diameters less than $1.0\mu$, preferably less than $0.5\mu$, and even more preferably less than $0.2\mu$. They exist in a variety of forms and have been prepared through the catalytic decomposition of various carbon-containing gases at metal surfaces. Such vermicular carbon deposits have been observed almost since the advent of electron microscopy. (Baker and Harris, *Chemistry and Physics of Carbon*, Walker and Thrower ed., Vol. 14, 1978, p. 83; Rodriguez, N., *J. Mater. Research*, Vol. 8, p. 3233 (1993)).

In 1976, Endo et al. (see Obelin, A. and Endo, M., *J. of Crystal Growth*, Vol. 32 (1976), pp. 335-349), hereby incorporated by reference, elucidated the basic mechanism by which such carbon fibrils grow. They were seen to originate from a metal catalyst particle, which, in the presence of a hydrocarbon containing gas, becomes supersaturated in carbon. A cylindrical ordered graphitic core is extruded which immediately, according to Endo et al., becomes coated with an outer layer of pyrolytically deposited graphite. These fibrils with a pyrolytic overcoat typically have diameters in excess of 0.1µ more typically 0.2 to 0.5µ.

In 1983, Tennent, U.S. Pat. No. 4,663,230, hereby incorporated by reference, describes carbon fibrils that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1µ and length to diameter ratios of at least 5. Desirably they are substantially free of a continuous thermal carbon overcoat, i.e., pyrolytically deposited carbon resulting from thermal cracking of the gas feed used to prepare them. Thus, the Tennent invention provided access to smaller diameter fibrils, typically 35 to 700 Å (0.0035 to 0.070µ) and to an ordered, "as grown" graphitic surface. Fibrillar carbons of less perfect structure, but also without a pyrolytic carbon outer layer have also been grown.

The carbon nanotubes which can be oxidized as taught in this application, are distinguishable from commercially available continuous carbon fibers. In contrast to these fibers which have aspect ratios (L/D) of at least $10^4$ and often $10^6$ or more, carbon fibrils have desirably large, but unavoidably finite, aspect ratios. The diameter of continuous fibers is also far larger than that of fibrils, being always >1.0µ and typically 5 to 7µ.

Tennent, et al., U.S. Pat. No. 5,171,560, hereby incorporated by reference, describes carbon fibrils free of thermal overcoat and having graphitic layers substantially parallel to the fibril axes such that the projection of said layers on said fibril axes extends for a distance of at least two fibril diameters. Typically, such fibrils are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than 0.1µ and length to diameter ratio of greater than 5. These fibrils can be oxidized by the methods of the invention.

When the projection of the graphitic layers on the nanotube axis extends for a distance of less than two nanotube diameters, the carbon planes of the graphitic nanotube, in cross section, take on a herring bone appearance. These are termed fishbone fibrils. Geus, U.S. Pat. No. 4,855,091, hereby incorporated by reference, provides a procedure for preparation of fishbone fibrils substantially free of a pyrolytic overcoat. These carbon nanotubes are also useful in the practice of the invention.

Carbon nanotubes of a morphology similar to the catalytically grown fibrils described above have been grown in a high temperature carbon arc (Iijima, Nature 354, 56, 1991). It is now generally accepted (Weaver, Science 265, 1994) that these arc-grown nanofibers have the same morphology as the earlier catalytically grown fibrils of Tennent. Arc grown carbon nanofibers after colloquiolly referred to as "bucky tubes", are also useful in the invention.

Useful single walled carbon nanotubes and process for making them are disclosed, for example, in "Single-shell carbon nanotubes of 1-nm diameter", S Iijima and T Ichihashi *Nature*, vol. 363, p. 603 (1993) and "Cobalt-catalysed growth of carbon nanotubes with single-atomic-layer walls," D S Bethune, C H Kiang, M S DeVries, G Gorman, R Savoy and R Beyers *Nature*, vol. 363, p. 605 (1993), both articles of which are hereby incorporated by reference.

Single walled carbon nanotubes are also disclosed in U.S. Pat. No. 6,221,330 to Moy et al., hereby incorporated by reference. Moy disclosed a process for producing hollow, single-walled carbon nanotubes by catalytic decomposition of one or more gaseous carbon compounds by first forming a gas phase mixture carbon feed stock gas comprising one or more gaseous carbon compounds, each having one to six carbon atoms and only H, O, N, S or Cl as hetero atoms, optionally admixed with hydrogen, and a gas phase metal containing compound which is unstable under reaction conditions for said decomposition, and which forms a metal containing catalyst which acts as a decomposition catalyst under reaction conditions; and then conducting said decomposition reaction under decomposition reaction conditions, thereby producing said nanotubes. The invention relates to a gas phase reaction in which a gas phase metal containing compound is introduced into a reaction mixture also containing a gaseous carbon source. The carbon source is typically a $C_1$ through $C_6$ compound having as hetero atoms H, O, N, S or Cl, optionally mixed with hydrogen. Carbon monoxide or carbon monoxide and hydrogen is a preferred carbon feedstock. Increased reaction zone temperatures of approximately 400° C. to 1300° C. and pressures of between about 0 and about 100 p.s.i.g., are believed to cause decomposition of the gas phase metal containing compound to a metal containing catalyst. Decomposition may be to the atomic metal or to a partially decomposed intermediate species. The metal containing catalysts (1) catalyze CO decomposition and (2) catalyze SWNT formation. Thus, the invention also relates to forming SWNT via catalytic decomposition of a carbon compound.

The invention of U.S. Pat. No. 6,221,330 may in some embodiments employ an aerosol technique in which aerosols of metal containing catalysts are introduced into the reaction mixture. An advantage of an aerosol method for producing SWNT is that it will be possible to produce catalyst particles of uniform size and scale such a method for efficient and continuous commercial or industrial production. The previously discussed electric arc discharge and laser deposition methods cannot economically be scaled up for such commercial or industrial production. Examples of metal containing compounds useful in the invention include metal carbonyls, metal acetyl acetonates, and other materials which under decomposition conditions can be introduced as a vapor which decomposes to form an unsupported metal catalyst. Catalytically active metals include Fe, Co, Mn, Ni and Mo. Molybdenum carbonyls and iron carbonyls are the preferred metal containing compounds which can be decomposed under reaction conditions to form vapor phase catalyst. Solid forms of these metal carbonyls may be delivered to a pretreatment zone where they are vaporized, thereby becoming the vapor phase precursor of the catalyst. It was found that two methods may be employed to form SWNT on unsupported catalysts.

The first method is the direct injection of volatile catalyst. The direct injection method is described is U.S. application Ser. No. 08/459,534, incorporated herein by reference. Direct injection of volatile catalyst precursors has been found to result in the formation of SWNT using molybdenum hexacarbonyl [$Mo(CO)_6$] and dicobalt octacarbonyl [$CO_2(CO)_8$] catalysts. Both materials are solids at room temperature, but sublime at ambient or near-ambient temperatures—the molybdenum compound is thermally stable to at least 150°, the cobalt compound sublimes with decomposition "Organic Syntheses via Metal Carbonyls," Vol. 1, 1. Wender and P. Pino, eds., Interscience Publishers, New York, 1968, p. 40).

The second method uses a vaporizer to introduce the metal containing compound (FIG. 12). In one preferred embodiment of the invention, the vaporizer 10, shown at FIG. 12, comprises a quartz thermowell 20 having a seal 24 about 1" from its bottom to form a second compartment. This compartment has two ¼" holes 26 which are open and exposed to the reactant gases. The catalyst is placed into this compartment, and then vaporized at any desired temperature using a vaporizer furnace 32. This furnace is controlled using a first thermocouple 22. A metal containing compound, preferably a metal carbonyl, is vaporized at a temperature below its decomposition point, reactant gases CO or CO/$H_2$ sweep the precursor into the reaction zone 34, which is controlled separately by a reaction zone furnace 38 and second thermocouple 42. Although applicants do not wish to be limited to a particular theory of operability, it is believed that at the reactor temperature, the metal containing compound is decomposed either partially to an intermediate species or completely to metal atoms. These intermediate species and/or metal atoms coalesce to larger aggregate particles which are the actual catalyst. The particle then grows to the correct size to both catalyze the decomposition of CO and promote SWNT growth. In the apparatus of FIG. 11, the catalyst particles and the resultant carbon forms are collected on the quartz wool plug 36. Rate of growth of the particles depends on the concentration of the gas phase metal containing intermediate species. This concentration is determined by the vapor pressure (and therefore the temperature) in the vaporizer. If the concentration is too high, particle growth is too rapid, and structures other than SWNT are grown (e.g., MWNT, amorphous carbon, onions, etc.) All of the contents of U.S. Pat. No. 6,221,330, including the Examples described therein, are hereby incorporated by reference.

U.S. Pat. No. 5,424,054 to Bethune et al., hereby incorporated by reference, describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are discussed, for instance laser heating, electron beam heating and RF induction heating.

Smalley (Guo, T., Nikoleev, P., Thess, A., Colbert, D. T., and Smalley, R. E., Chem. Phys. Lett. 243: 1-12 (1995)), hereby incorporated by reference, describes a method of producing single-walled carbon nanotubes wherein graphite rods and a transition metal are simultaneously vaporized by a high-temperature laser.

Smalley (Thess, A., Lee, R., Nikolaev, P., Dai, R., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996)), hereby incorporated by reference, also describes a process for production of single-walled carbon nanotubes in which a graphite rod containing a small amount of transition metal is laser vaporized in an oven at about 1200° C. Single-wall nanotubes were reported to be produced in yields of more than 70%.

Supported metal catalysts for formation of SWNT are also known. Smalley (Dai., H., Rinzler, A. G., Nikolaev, P., Thess, A., Colbert, D. T., and Smalley, R. E., Chem. Phys. Lett. 260:471-475 (1996)), hereby incorporated by reference, describes supported Co, Ni and Mo catalysts for growth of both multiwalled nanotubes and single-walled nanotubes from CO, and a proposed mechanism for their formation.

Carbon nanotubes differ physically and chemically from continuous carbon fibers which are commercially available as reinforcement materials, and from other forms of carbon such as standard graphite and carbon black. Standard graphite, because of its structure, can undergo oxidation to almost complete saturation. Moreover, carbon black is amorphous carbon generally in the form of spheroidal particles having a graphene structure, carbon layers around a disordered nucleus. The differences make graphite and carbon black poor predictors of nanotube chemistry.

Aggregates of Carbon Nanotubes

As produced, carbon nanotubes may be in the form of discrete nanotubes, aggregates of nanotubes or both.

Nanotubes produced or prepared as aggregates have various morphologies (as determined by scanning electron microscopy) in which they are randomly entangled with each other to form entangled balls of nanotubes resembling bird nests ("BN"); or as aggregates consisting of bundles of straight to slightly bent or kinked carbon nanotubes having substantially the same relative orientation, and having the appearance of combed yarn ("CY") e.g., the longitudinal axis of each nanotube (despite individual bends or kinks) extends in the same direction as that of the surrounding nanotubes in the bundles; or, as, aggregates consisting of straight to slightly bent or kinked nanotubes which are loosely entangled with each other to form an "open net" ("ON") structure. In open net structures the extent of nanotube entanglement is greater than observed in the combed yarn aggregates (in which the individual nanotubes have substantially the same relative orientation) but less than that of bird nest. Other useful aggregate structures include the cotton candy ("CC") structure, which is similar to the CY structure.

The morphology of the aggregate is controlled by the choice of catalyst support. Spherical supports grow nanotubes in all directions leading to the formation of bird nest aggregates. Combed yarn and open net aggregates are prepared using supports having one or more readily cleavable planar surfaces, e.g., an iron or iron-containing metal catalyst particle deposited on a support material having one or more readily cleavable surfaces and a surface area of at least 1 square meters per gram. Moy et al., U.S. application Ser. No. 08/469,430 entitled "Improved Methods and Catalysts for the Manufacture of Carbon Fibrils", filed Jun. 6, 1995, hereby incorporated by reference, describes nanotubes prepared as aggregates having various morphologies (as determined by scanning electron microscopy).

Further details regarding the formation of carbon nanotube or nanofiber aggregates may be found in the disclosure of U.S. Pat. No. 5,165,909 to Tennent; U.S. Pat. No. 5,456,897 to Moy et al.; Snyder et al., U.S. patent application Ser. No. 07/149,573, filed Jan. 28, 1988, and PCT Application No. US89/00322, filed Jan. 28, 1989 ("Carbon Fibrils") WO 89/07163, and Moy et al., U.S. patent application Ser. No. 413,837 filed Sep. 28, 1989 and PCT Application No. US90/05498, filed Sep. 27, 1990 ("Battery") WO 91/05089, and U.S. application Ser. No. 08/479,864 to Mandeville et al., filed Jun. 7, 1995 and U.S. application Ser. No. 08/284,917, filed Aug. 2, 1994 and U.S. application Ser. No. 08/320,564, filed Oct. 11, 1994 by Moy et al., all of which are assigned to the same assignee as the invention here and are hereby incorporated by reference.

Oxidation and/or Functionalization of Carbon Nanotubes

Carbon nanotubes or aggregates may be oxidized to enhance certain desirable properties. For example, oxidation can be used to add certain groups onto the surface of the carbon nanotubes or carbon nanotube aggregates, to loosen the entanglement of the carbon nanotube aggregates, to reduce the mass or remove the end caps off the carbon nanotubes, etc.

McCarthy et al., U.S. patent application Ser. No. 08/329,774 filed Oct. 27, 1994, hereby incorporated by reference, describes processes for oxidizing the surface of carbon fibrils that include contacting the fibrils with an oxidizing agent that includes sulfuric acid ($H_2SO_4$) and potassium chlorate ($KClO_3$) under reaction conditions (e.g., time, temperature, and pressure) sufficient to oxidize the surface of the fibril. The fibrils oxidized according to the processes of McCarthy, et al. are non-uniformly oxidized, that is, the carbon atoms are substituted with a mixture of carboxyl, aldehyde, ketone, phenolic and other carbonyl groups.

Fibrils have also been oxidized non-uniformly by treatment with nitric acid. International Application PCT/US94/10168 filed on Sep. 9, 1994 as WO 95/07316 discloses the formation of oxidized fibrils containing a mixture of functional groups. Hoogenvaad, M. S., et al. ("Metal Catalysts supported on a Novel Carbon Support," presented at Sixth International Conference on Scientific Basis for the Preparation of Heterogeneous Catalysts, Brussels, Belgium, September 1994) also found it beneficial in the preparation of fibril-supported precious metals to first oxidize the fibril surface with nitric acid. Such pretreatment with acid is a standard step in the preparation of carbon-supported noble metal catalysts, where, given the usual sources of such carbon, it serves as much to clean the surface of undesirable materials as to functionalize it.

In published work, McCarthy and Bening (Polymer Preprints ACS Div. of Polymer Chem. 30 (1)420(1990)) prepared derivatives of oxidized fibrils in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal. These compounds were not isolated and are, unlike the derivatives described herein, of no practical significance.

Fischer et al., U.S. Ser. No. 08/352,400 filed Dec. 8, 1994, Fischer et al., U.S. Ser. No. 08/812,856 filed Mar. 6, 1997, Tennent et al., U.S. Ser. No. 08/856,657 filed May 15, 1997, Tennent, et al., U.S. Ser. No. 08/854,918 filed May 13, 1997, and Tennent et al., U.S. Ser. No. 08/857,383 filed May 15, 1997, all hereby incorporated by reference describe processes for oxidizing the surface of carbon fibrils that include contacting the fibrils with a strong oxidizing agent such as a solution of alkali metal chlorate in a strong acid such as sulfuric acid. Additional useful oxidation treatments for carbon nanotubes include those described in Niu, US Published Application No. 2005/0002850A1, filed May 28, 2004, hereby incorporated by reference.

Additionally, these applications also describe methods of uniformly functionalizing carbon fibrils by sulfonation, electrophilic addition to deoxygenated fibril surfaces or metallation. Sulfonation of the fibrils can be accomplished with sulfuric acid or $SO_3$ in vapor phase which gives rise to carbon fibrils bearing appreciable amounts of sulfones so much so that the sulfone functionalized fibrils show a significant weight gain.

U.S. Pat. No. 5,346,683 to Green, et al. describes uncapped and thinned carbon nanotubes produced by reaction with a flowing reactant gas capable of reacting selectively with carbon atoms in the capped end region of arc grown nanotubes.

U.S. Pat. No. 5,641,466 to Ebbesen, et al. describes a procedure for purifying a mixture of arc grown arbon nanotubes and impurity carbon materials such as carbon nanoparticles and possibly amorphous carbon by heating the mixture in the presence of an oxidizing agent at a temperature in the range of 600° C. to 1000° C. until the impurity carbon materials are oxidized and dissipated into gas phase.

In a published article Ajayan and Iijima (Nature 361, p. 334-337 (1993)) discuss annealing of carbon nanotubes by heating them with oxygen in the presence of lead which results in opening of the capped tube ends and subsequent filling of the tubes with molten material through capillary action.

In other published work, Haddon and his associates ((Science, 282, 95 (1998) and J. Mater. Res., Vol. 13, No. 9, 2423 (1998)) describe treating single-walled carbon nanotube materials (SWNTM) with dichlorocarbene and Birch reduction conditions in order to incorporate chemical functionalities into SWNTM. Derivatization of SWNT with thionyl chloride and octadecylamine rendered the SWNT soluble in common organic solvents such as chloroform, dichloromethane, aromatic solvents and $CS_2$.

Additionally functionalized nanotubes have been generally discussed in U.S. Ser. No. 08/352,400 filed on Dec. 8, 1994 and in U.S. Ser. No. 08/856,657 filed May 15, 1997, both incorporated herein by reference. In these applications the nanotube surfaces are first oxidized by reaction with strong oxidizing or other environmentally unfriendly chemical agents. The nanotube surfaces may be further modified by reaction with other functional groups. The nanotube surfaces have been modified with a spectrum of functional groups so that the nanotubes could be chemically reacted or physically bonded to chemical groups in a variety of substrates.

Complex structures of nanotubes have been obtained by linking functional groups on the tubes with one another by a range of linker chemistries.

Representative functionalized nanotubes broadly have the formula

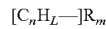

where n is an integer, L is a number less than 0.1 n, m is a number less than 0.5 n, each of R is the same and is selected from $SO_3H$, COOH, $NH_2$, OH, O, CHO, CN, COCl, halide, COSH, SH, R', COOR', SR', $SiR'_3$, $Si(-OR'-)_yR'_{3-y}$, $Si(-O-SiR'_2-)$OR', R", Li, $AlR'_2$, Hg—X, $TlZ_2$ and Mg—X, y is an integer equal to or less than 3, R' is alkyl, aryl, heteroaryl, cycloalkyl aralkyl or heteroaralkyl, R" is fluoroalkyl, fluoroaryl, fluorocycloalkyl, fluoroaralkyl or cycloaryl, X is halide, and Z is carboxylate or trifluoroacetate.

The carbon atoms, $C_n$, are surface carbons of the nanofiber.

Secondary Derivatives of Oxidized Nanotubes

Oxidized carbon nanotubes or carbon nanotube aggregates can be further treated to add secondary functional groups to the surface. In one embodiment; oxidized nanotubes are further treated in a secondary treatment step by further contacting with a reactant suitable to react with moieties of the oxidized nanotubes thereby adding at least another secondary functional group. Secondary derivatives of the oxidized nanotubes are essentially limitless. For example, oxidized nanotubes bearing acidic groups like —COOH are convertible by conventional organic reactions to virtually any desired secondary group, thereby providing a wide range of surface hydrophilicity or hydrophobicity.

The secondary group that can be added by reacting with the moieties of the oxidized nanotubes include but are not limited to alkyl/aralkyl groups having from 1 to 18 carbons, a hydroxyl group having from 1 to 18 carbons, an amine group having from 1 to 18 carbons, alkyl aryl silanes having from 1 to 18 carbons and fluorocarbons having from 1 to 18 carbons.

SUMMARY OF THE INVENTION

The present invention, which addresses the needs of the prior art provides a method of preparing conductive thermoset precursors containing carbon nanotubes. Also provided is a method of preparing conductive thermosets containing carbon nanotubes.

The carbon nanotubes may be in individual form or in the form of aggregates having a macromorphology resembling the shape of a cotton candy, bird nest, combed yarn or open net. Preferred multiwalled carbon nanotubes have diameters no greater than 1 micron and preferred single walled carbon nanotubes have diameters less than 5 nm.

It has been discovered that carbon nanotubes may be adequately dispersed in a thermoset precursor by using an extrusion process generally reserved for thermoplastics. In a preferred embodiment, carbon nanotubes are dispersed by extrusion within a thermoset precursor having a viscosity greater than 15 poise. The thermoset precursor may have a viscosity in the range of 20 to 600 poise or between 50 to 500 poise. The thermoset precursor may be a precursor for epoxy, phenolic, urethane, silicone, polyimide, polyester or vinyl ester. A preferred thermoset precursor is a bisphenol A derivative.

The conductive thermoset precursor preferably contains 0.5 to 30% carbon nanotube or carbon nanotube aggregates by weight.

Where the thermoset precursor contains epoxide, the epoxide weight per equivalent is greater than 600 gram precursor/gram equivalent epoxide, preferably 600 to 4000 gram precursor/gram equivalent epoxide, more preferably 1000 to 3800 gram precursor/gram equivalent epoxide.

The thermoset precursor may further contain a diluting or let down agent which is added to keep the precursor in a viscous non-solid, gel-like or liquid state before mixing with the second thermoset precursor to form a conductive thermoset. Mixers which generate shear, such as Brabender mixer, planetary mixer, multi-shaft mixer, etc. may be used to include or mix the diluting agent into the conductive thermoset precursor. In a preferred embodiment, the diluting agent is another thermoset precursor which does not react upon addition with the first thermoset precursor to cure into or become the final thermoset product.

The melting point of the thermoset precursor may be greater than 30° C., or conveniently between 30 and 350° C.

Extrusion may be accomplished with a single screw, twin screw or any other conventional extruders useful for dispersing additives in the thermoset precursor. Furthermore, the twin screw extruder may be counter rotating or co-rotating.

The conductive thermoset precursor prepared according to the present invention is then reacted with at least a second thermoset precursor to form a conductive thermoset. The conductive thermoset may have a resistivity less than $10^{11}$ ohm-cm, preferably less than $10^8$ ohm-cm, more preferably less than $10^6$ ohm-cm.

Other improvements which the present invention provides over the prior art will be identified as a result of the following description which sets forth a preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE PREFERRED EMBODIMENTS

Definitions

The terms "nanotube", "nanofiber" and "fibril" are used interchangeably to refer to single walled or multiwalled carbon nanotubes. Each refers to an elongated hollow structure preferably having a cross section (e.g., angular fibers having edges) or a diameter (e.g., rounded) less than 1 micron (for multiwalled nanotubes) or less than 5 nm (for single walled nanotubes). The term "nanotube" also includes "buckytubes" and fishbone fibrils.

"Multiwalled nanotubes" as used herein refers to carbon nanotubes which are substantially cylindrical, graphitic nanotubes of substantially constant diameter and comprise a single cylindrical graphitic sheet or layer whose c-axis is substantially perpendicular to the cylindrical axis, such as those described, e.g., in U.S. Pat. No. 5,171,560 to Tennent, et al. The term "multiwalled nanotubes" is meant to be interchangeable with all variations of said term, including but not limited to "multi-wall nanotubes", "multi-walled nanotubes", "multiwall nanotubes," etc.

"Single walled nanotubes" as used herein refers to carbon nanotubes which are substantially cylindrical, graphitic nanotubes of substantially constant diameter and comprise cylindrical graphitic sheets or layers whose c-axes are substantially perpendicular to their cylindrical axis, such as those described, e.g., in U.S. Pat. No. 6,221,330 to Moy, et al. The term "single walled nanotubes" is meant to be interchangeable with all variations of said term, including but not limited to "single-wall nanotubes", "single-walled nanotubes", "single wall nanotubes," etc.

The term "functional group" refers to groups of atoms that give the compound or substance to which they are linked characteristic chemical and physical properties.

A "functionalized" surface refers to a carbon surface on which chemical groups are adsorbed or chemically attached.

"Graphenic" carbon is a form of carbon whose carbon atoms are each linked to three other carbon atoms in an essentially planar layer forming hexagonal fused rings. The layers are platelets only a few rings in diameter or they may be ribbons, many rings long but only a few rings wide.

"Graphenic analogue" refers to a structure which is incorporated in a graphenic surface.

"Graphitic" carbon consists of graphenic layers which are essentially parallel to one another and no more than 3.6 angstroms apart.

The term "aggregate" refers to a dense, microscopic particulate structure comprising entangled carbon nanotubes.

The term "precursor" means any component or ingredient which is used in preparing the final crosslinked or cured polymer product. Precursors include monomers or polymers which have not yet been crosslinked or cured to form the final crosslinked or cured polymer product.

"Thermoplastics" refer generally to a class of polymers that typically soften or melt upon heating.

"Thermosets" refer generally to a class of polymers that do not melt upon heating.

The term "viscosity" measures or characterizes the internal resistance to flow exhibited by a material in a fluid like state. Where a material such as a solid needs to be melted in order to permit flow (e.g., because solids cannot flow, they have infinite viscosity), the term "melt viscosity" is often used to measure or characterize the internal resistance of the melted material. Therefore, for purposes of this application and terms used herein, the terms "viscosity" and "melt viscosity" are interchangeable since they both measure or characterize the material or melted material's internal resistance to flow.

Carbon Nanotubes and Carbon Nanotube Aggregates

Any of the carbon nanotubes and carbon nanotube aggregates described in the Description Of The Related Art under the heading "Carbon Nanotubes" or "Aggregates Of Carbon Nanotubes" may be used in practicing the invention, and all of those references therein are hereby incorporated by reference.

The carbon nanotubes preferably have diameters no greater than one micron, more preferably no greater than 0.2 micron. Even more preferred are carbon nanotubes having diameters between 2 and 100 nanometers, inclusive. Most preferred are carbon nanotubes having diameters less than 5 nanometers or between 3.5 and 75 nanometers, inclusive.

The nanotubes are substantially cylindrical, graphitic carbon fibrils of substantially constant diameter and are substantially free of pyrolytically deposited carbon. The nanotubes include those having a length to diameter ratio of greater than 5 with the projection of the graphite layers on the nanotubes extending for a distance of at least two nanotube diameters.

Most preferred multiwalled nanotubes are described in U.S. Pat. No. 5,171,560 to Tennent, et al., incorporated herein by reference. Most preferred single walled nanotubes are described in U.S. Pat. No. 6,221,330 to Moy, et al., incorporated herein by reference. Carbon nanotubes prepared according to U.S. Pat. No. 6,696,387 are also preferred and incorporated by reference.

The aggregates of carbon nanotubes, which are dense, microscopic particulate structure comprising entangled carbon nanotubes and which have a macromorphology that resembles a birds nest, cotton candy, combed yarn, or open net. As disclosed in U.S. Pat. No. 5,110,693 and references therein (all of which are herein incorporated by reference), two or more individual carbon fibrils may form microscopic aggregates of entangled fibrils. The cotton candy aggregate resembles a spindle or rod of entangled fibers with a diameter that may range from 5 nm to 20 nm with a length that may range from 0.1 µm to 1000 µm. The birds nest aggregate of fibrils can be roughly spherical with a diameter that may range from 0.1 µm to 1000 µm. Larger aggregates of each type (CC and/or BN) or mixtures of each can be formed.

The aggregates of carbon nanotubes may be tightly entangled or may be loosely entangled. If desired, the carbon nanotube aggregates may be treated with an oxidizing agent to further loosen the entanglement of the carbon nanotubes without destroying the aggregate structure itself.

Methods of Preparing Conductive Thermoset Precursors And Conductive Thermoset

Preferred thermosets which are useful in forming conductive thermosets include. phenolics, ureas, melamines, epoxies, polyesters, vinyl esters, silicones, polyimides, urethanes, and polyurethanes.

As discussed under the earlier heading "Conductive Polymers," thermosets are generally formed by chemically reacting at least two separate components or precursors. The chemical reaction may include the use of catalysts, chemicals, energy, heat or radiation so as to foster intermediate bonding such as crosslinking. The thermoset bonding/forming process is often referred to as curing. Different combination of components or precursors, as well as different chemical reactions can be used for forming the desired thermoset.

Therefore, the present invention includes both conductive thermosets as well as conductive thermoset precursors or components used to make conductive thermosets. Methods for preparing conductive thermosets and conductive thermoset precursors are also disclosed herein.

It has been discovered that conductive thermosets can be formed from conductive thermoset precursors which have been prepared from an extrusion process typically reserved for thermoplastics. Other conventional mixing equipments or processes, such as with a Brabender mixer, planetary mixer, Waring blender, sonication, etc. may be used to disperse or mix other materials such as diluting agents into the conductive thermoset precursor.

In a preferred embodiment, a first thermoset precursor is mixed with carbon nanotubes or carbon nanotube aggregates by extrusion (e.g., using an extruder) to form a conductive thermoset precursor. The first thermoset precursor may be liquid or solid. The extruder may be a single screw, reciprocating single screw (e.g., Buss kneader), twin screw or any other conventional extruders useful for dispersing additives in the thermoset precursor. Furthermore, the twin screw extruder may be counter rotating or co-rotating.

Extrusion of the first thermoset precursor is only feasible within a critical range of viscosities. Viscosity is often a function of shear force and includes complex viscosity and the stress strain curve. Viscosity is explained in more detail in Macosko, Christopher W., *Rheology: Principles, measurements and applications*, Wiley-VCH (1994), hereby incorporated by reference. On the one hand, it has been discovered that the extrusion process does not generate enough shear force to disperse carbon nanotubes or carbon nanotube aggregates in thermoset precursors with low viscosity. Conversely, thermoset precursors with high viscosity cannot be processed through the extruder. Therefore, in one embodiment, the thermoset precursor have viscosities greater than 15 poise, preferably between 20 and 600 poise, more preferably between 50 and 500 poise. Temperature may be adjusted in the extruder if necessary to obtain the desired viscosity. For example, a solid thermoset precursor is typically melted in the extruder before proceeding with the extrusion process. In such case, the thermoset precursor is said to have a viscosity or melt viscosity greater than 15 poise, preferably between 20 and 600 poise, more preferably between 50 and 500 poise.

The state or viscosity of a conductive thermoset precursor may be adjusted by the inclusion or addition of a diluting or let down agent to obtain a more suitable viscosity or state for the extrusion process. For example, a conductive thermoset precursor in solid or powdered form may include or may be mixed with a liquid, non-solid or gel-like diluting agent which will result in the conductive thermoset precursor being maintained in a viscous liquid, non-solid or gel-like state. The diluting agent includes thermoset precursor which upon addition does not react with the first thermoset precursor to cure or become the final thermoset product. The diluting or let down agent may be included, mixed or added by use of a planetary mixer, Brabender mixer, Waring blender, sonicator or other conventional mixing equipment which generates the requisite level of shear or force to facilitate mixing of such ingredients.

To form commercially viable conductive thermosets, it is preferred that the conductive thermoset precursor contain carbon nanotube or carbon nanotube aggregates at loadings between 0.5 and 40%, preferably between 0.5 and 30%. Other exemplary carbon nanotube or carbon nanotube aggregate loading ranges include 5 to 40%, 1 to 15% or 5 to 15%.

Once a conductive thermoset precursor has been formed, a conductive thermoset can then be made by reacting the conductive thermoset precursor with the corresponding known second thermoset precursor to form the conductive thermoset, which will preferably have a 1 to 5% carbon nanotube or carbon nanotube aggregate loading. The second thermoset precursor mayor may not contain carbon nanotube or carbon nanotube aggregates. The conductive thermoset may have a resistivity less than $10^{11}$ ohm-cm, preferably less than $10^8$ ohm-cm, more preferably less than $10^6$ ohm-cm.

It has been further discovered that where the first thermoset precursor contain epoxide (a reactive three member oxygen group), the amount of epoxides in the precursor can affect the dispersion of the carbon nanotubes and carbon nanotube aggregates therein. In one embodiment, the weight per epoxide of the first thermoset precursor is greater than 600 gram precursor/gram equivalent epoxide. Preferably, the weight per epoxide in the first thermoset precursor is between 600 and 4000 gram precursor/gram equivalent epoxide. More preferably, the weight per epoxide in the first thermoset precursor is between 1000 and 3800 gram precursor/gram equivalent epoxide.

Since the first thermoset precursor may need to be melted in order to be used With the extrusion process, the melting point of the first thermoset precursor may also play a role in affecting the dispersion of the carbon nanotubes and carbon nanotube aggregates. It is preferred that the melting point of the first thermoset precursor be greater than 30° C., or conveniently between 30 and 350° C. Higher melting point decreases the likelihood of feedstock bridging in the feed port of the extruder. However, one skilled in the art will understand that the extruder can be cooled as necessary to temperatures as low as −40° C. by using an appropriate coolant in order to obtain viscosity within the preferred range.

The following sections describe various methods of preparing specific conductive thermoset precursors and conductive thermosets with epoxy, polyester, vinyl ester and silicone. All of the discussions under this section apply to these subsequent sections (i.e., procedure, epoxide, viscosity, carbon nanotube or carbon nanotube aggregate disclosure, melting point, resistivity, etc.). Further, one skilled in the art will recognize that these descriptions are not exhaustive and can be modified in accordance with the teachings herein. Moreover, these specific conductive thermoset description, coupled with the general conductive thermoset description, provide one skilled in the art with the knowledge and skill to prepare any other conductive thermoset precursors or conductive thermosets such as conductive urethane and phenolics.

Methods of Preparing Conductive Epoxy Precursors and Conductive Epoxy Resins

Epoxy is a well known thermoset having a variety of uses and applications such as surface coatings, adhesives, castings, panels, shielding materials, etc. Conductive epoxy resins would find use in a number of applications, including in high temperature applications (e.g., up to 160° C.). Conductive epoxy resins would be useful to facilitate electrostatic dissipation (e.g., ESD pre-preg for aviation industry, ESD adhesives for electronics assembly, etc.) Conductive epoxy resins can be used as coatings for galvanic corrosion protection. Conductive epoxy resins would also be useful in making low cost tool by permitting chrome plating on the epoxy mold surface.

Epoxy resins typically contain epoxide groups, which are reactive three member oxygen groups. Epoxy resins are formed from a number of conventional and known epoxy precursors. One common combination is epichlorohydrin and the aromatic bisphenol A. Alternatively, epoxy can be formed from epichlorohydrin and aliphatic polyols such as glycerol. Epoxy may also be made by starting with di-epoxide compounds and curing them with diamines. Another method for forming epoxy resins include oxidizing polyolefins with peracetic acid and curing with anhydrides at high temperatures.

Epoxy resins can be cured by heat or by passing a current though the epoxy, thereby reducing heating costs and improving quality control in the manufacture of parts and assemblies. The ability to cure with an electrical current make epoxy a very useful adhesive in military and aerospace applications.

In a preferred embodiment, conductive epoxy precursors are prepared by mixing a first epoxy precursor with carbon nanotubes or carbon nanotubes aggregates via extrusion. The conductive epoxy precursor may further include a diluting or let down agent (or may be mixed with such) to adjust the viscosity or state of the conductive epoxy precursor. The diluting or let down agent may be included, mixed or added by use of a planetary mixer, Brabender mixer or other conventional mixing equipment which generates the requisite level of shear or force to facilitate mixing of such ingredients. The diluting or let down agent can be other epoxy precursors which, when included, mixed or added to the conductive epoxy precursor, will not upon addition to the conductive epoxy precursor cure to form the final epoxy resin.

To form the desired conductive epoxy resin, the conductive epoxy precursor is then mixed or reacted with another epoxy precursor (and/or other components as necessary).

It is preferred that the carbon nanotube or carbon nanotube aggregate loading in the conductive epoxy precursor be between 0.5 and 40%, preferably between 0.5 and 30%. Other exemplary carbon nanotube or carbon nanotube aggregate loading ranges in the conductive epoxy precursor include 5 to 40%, 1 to 15% or 5 to 15%. The second epoxy precursor mayor may not contain carbon nanotubes or carbon nanotube aggregates. The mixture is then cured, and the final conductive epoxy product can contain between 1 to 5% carbon nanotube or carbon nanotube aggregate loading. One skilled in the art will recognize that the conductive loading of the final product is flexible and is controlled by the respective conductive loading in the first and second epoxy precursors.

It has been discovered that the amount of epoxides in the epoxy precursor can affect the dispersion of the carbon nanotubes and carbon nanotube aggregates therein. In one embodiment, the weight per epoxide of the first epoxy precursor is greater than 600 gram precursor/gram equivalent epoxide. Preferably, the weight per epoxide in the first epoxy precursor is between 600 and 4000 gram precursor/gram equivalent epoxide. More preferably, the weight per epoxide in the first epoxy precursor is between 1000 and 3800 gram precursor/gram equivalent epoxide.

It has also been discovered that the viscosity of the first epoxy precursor also affects the dispersion of the carbon nanotubes and carbon nanotube aggregates therein. In one embodiment, the first epoxy precursor has a viscosity greater than 15 poise. Preferably, the first epoxy precursor has a viscosity between 20 to 600 poise, more preferably between 50 and 500 poise.

The melting point of the first epoxy precursor may also playa role in affecting the dispersion of the carbon nanotubes and carbon nanotube aggregates. It is preferred that the melting point of the first epoxy precursor be greater than 30° C., more preferably between 30 and 350° C. Higher melting point decreases the likelihood of feedstock bridging in the feed port of the extruder.

Methods of Preparing Other Conductive Thermoset Precursors and Conductive Thermosets

Polyester

Polyester is another popular thermoset having a number of uses in reinforcing plastics, automotive parts, boat hulls, foams, protective coatings, structural applications, pipings, etc. As such, conductive polyester would also find a number of useful applications as well.

Precursor polyester resins are made by reacting dicarboxylic acids (for example, maleic and phthalic acids) with glycols (for example, propylene and diethylene glycols) in a jacketed and agitated reactor kettle. In practice, the anhydrous forms of the dicarboxylic acids are preferred. The process is a batch operation, with cycle" cook" times ranging from 6 up to 24 hours, depending on the type of precursor resin being made.

As the reaction proceeds in the kettle, the polymer molecular weight increases, causing the viscosity to increase and the acid value to decrease. These two precursor resin properties are continually monitored to determine when the resin has met the predetermined end point. When the end point is met, the reaction is stopped and the hot precursor resin mixture is transferred into an agitated "drop" tank containing styrene monomer. The styrene monomer acts as both a solvent for the molten resin and also as a cross-linking agent when used by the fabricator or end-user. By this stage, the resin precursor would have cooled down (e.g. to around 80° C.).

At any stage in the preparation of the polyester precursor resin, carbon nanotubes or carbon nanotube aggregates can be mixed with the polyester precursor resin and extruded in accordance with a preferred embodiment to form the conductive polyester precursor. The carbon nanotube or carbon nanotube aggregates may be added at a 0.5 and 40% loading, preferably between 0.5 and 30%. Other exemplary carbon nanotube or carbon nanotube aggregate loading ranges include 5 to 40%, 1 to 15% or 5 to 15%.

Once extruded, the conductive polyester precursor resin can be further modified using conventional techniques to meet various predetermined requirements such as resin viscosity and reactivity properties.

To form conductive polyester, the conductive polyester precursor resins, which have reactive sites resulting from the incorporation of the anhydrous forms of unsaturated diacarboxylic acids (e.g. maleic anhydride), are crosslinked with the styrene monomer via a free radical reaction. Liquid styrene or other reactive unsaturated monomers may be used to crosslink the conductive polyester precursor resin. This reaction can be initiated by the addition of a catalyst, such as a peroxide catalyst (e.g., methyl ethyl ketone peroxide (MEKP)). The final conductive polyester product can contain between 1 to 5% carbon nanotube or carbon nanotube aggregate loading

Vinyl Ester

Another thermoset having a variety of useful application is vinyl ester. Unlike polyester, vinyl ester do not absorb as much water, and do not shrink as much when cured. Vinyl esters also have very good chemical resistance and bond well to glass due to the presence of hydroxyl groups. As such, conductive vinyl ester precursors and conductive vinyl esters would also find a number of practical uses.

Vinyl ester resin precursors are made by reacting a di-epoxide with acrylic acid, or methacrylic acid:

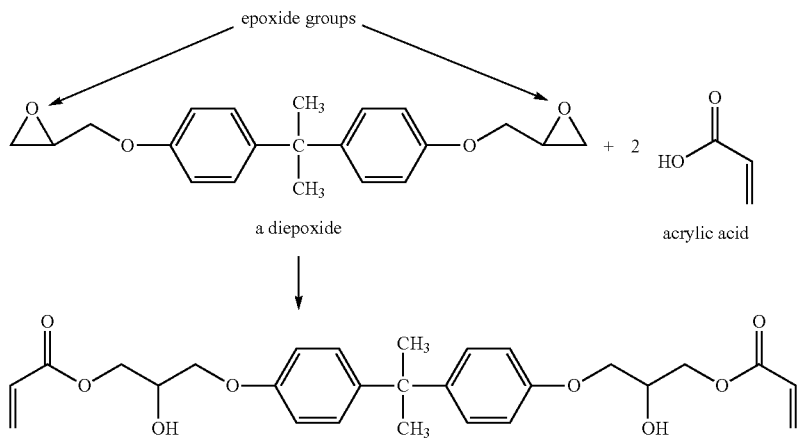

Larger oligomers such as the following can be used as well:

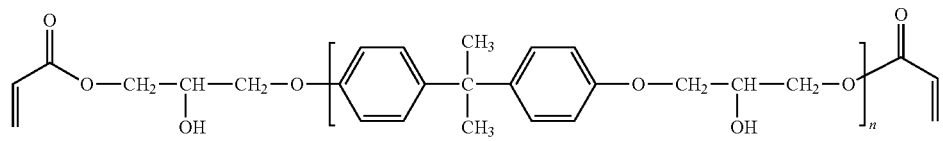

Carbon nanotubes or carbon nanotube aggregates can be mixed with the di-epoxide component of the vinyl ester precursor before or after the mixing with acrylic acid, and the mixed precursor resin extruded in accordance with a preferred embodiment to form a conductive vinyl ester precursor resin. The carbon nanotube or carbon nanotube aggregates may be added at a 0.5 and 40% loading, preferably between 0.5 and 30%. Other exemplary carbon nanotube or carbon nanotube aggregate loading ranges include 5 to 40%, 1 to 15% or 5 to 15%.

In a preferred embodiment, the polyester or vinyl ester precursor is a bisphenol A derivative. As such, a preferred conductive precursor comprises a bisphenol A derivative and carbon nanotubes or carbon nanotube aggregates. The preferred conductive precursor is formed by extruding the bisphenol A derivative and carbon nanotubes or carbon nanotube aggregates under conditions sufficient to disperse the nanotube or aggregates in the bisphenol A derivative.

The conductive vinyl ester precursor resin is then cured or crosslinked to form vinyl ester by polymerizing the vinyl groups. The final conductive vinyl ester product can contain between 1 to 5% carbon nanotube or carbon nanotube aggregate loading.

Silicone

Yet another thermoset which has a number of useful applications is silicone. Silicone precursors come in a variety of different viscosities. It has been discovered that certain silicone precursors are have viscosities at room temperature which are conducive to the extrusion process. These silicone precursors are thus unique over a number of thermoset precursors in that they do not need to be melted first at an elevated temperature in order to be used with the extrusion process.

Thus, a conductive silicone precursor can be formed by extruding carbon nanotubes or carbon nanotube aggregates with a first silicone precursor in accordance with a preferred embodiment. Preferably, the silicone precursor has a viscosity at room temperature which is amenable to the extrusion process. An example of such silicone precursor is vinylterminated polydimethylsiloxane. The carbon nanotube or carbon nanotube aggregates may be added at a 0.5 and 40% loading, preferably between 0.5 and 30%. Other exemplary carbon nanotube or carbon nanotube aggregate loading ranges include 5 to 40%, 1 to 15% or 5 to 15%.

The conductive silicone precursor can then be mixed with a second silicone precursor (or reacted with air or other elements if no second silicone precursor is needed) to form the conductive silicone. The final conductive silicone product can contain between 1 to 5% carbon nanotube or carbon nanotube aggregate loading

EXAMPLES

The following examples serve to provide further appreciation of the invention but are not meant in any way to restrict the effective scope of the invention.

Example 1

Experiments were conducted with EPON 1001F, an epoxy precursor made and sold by Resolution Performance Products with a weight per epoxide of 525-550 gram precursor/gram equivalent epoxide (as measured by HC-427G or ASTM D-1652-97 perchloric acid methods), melt viscosity of 4.4 poise (as measured by HC-710B or ASTM D-2196-86 (1991) el at 150° C. by Brookfield Viscometer), and melting point range of 70 to 80° C.

5 weight-% of BN carbon nanotube aggregates were added to EPON 1001F and sent through a co-rotating twin screw extruder having the following settings:

| Parameter | Set Point | Actual |
|---|---|---|
| Feed Zone, ° F. | 100 | 100 |
| Zone 1, ° F. | 150 | 149 |
| Zone 2, ° F. | 200 | 200 |
| Zone 3, ° F. | 200 | 200 |
| Zone 4, ° F. | 185 | 185 |
| Zone 5, ° F. | 160 | 160 |
| Zone 6, ° F. | 160 | 160 |
| Zone 7, ° F. | 160 | 160 |
| Zone 8, ° F. | 170 | 170 |
| Zone 9, ° F. | 180 | 181 |
| Die Zone 1, ° F. | 200 | 204 |
| Screw Speed, RPM | — | 150 |
| % Load | — | 43 |
| Side Stuffer, RPM | — | 125 |
| Polymer Feeder, Dial | — | 301 |
| Fibril Feeder, Dial | — | 167 |
| Melt Temperature, ° F. | — | 218 |
| Head Pressure, psi | — | 12 |
| Rate, lbs/hr | — | 8.0 |

Experiments with EPON 1001F were not successful as the material could not be processed due to the low viscosity. The material also bridged in the feed throat. A number of processing parameters were adjusted but did not result in an acceptable extrusion. Thus, this experiment was aborted.

Example 2

Experiments were conducted with EPON 1009F, an epoxy precursor made and sold by Resolution Performance Products with a weight per epoxide of 2300-3800 gram precursor/gram equivalent epoxide (as measured by HC-427G or ASTM D-1652-97 perchloric acid methods), melt viscosity greater than 500 poise (as measured by HC-710B or ASTM D-2196-86 (1991) el at 150° C. by Brookfield Viscometer), and melting point range of 130 to 140° C.

15 weight-% of BN carbon nanotube aggregates were added to EPON 1009F and sent through a co-rotating twin screw extruder having the following settings:

| Parameter | Set Point | Actual |
|---|---|---|
| Feed Zone, ° F. | 90 | 91 |
| Zone 1, ° F. | 210 | 210 |
| Zone 2, ° F. | 290 | 290 |
| Zone 3, ° F. | 290 | 290 |
| Zone 4, ° F. | 255 | 256 |
| Zone 5, ° F. | 255 | 255 |
| Zone 6, ° F. | 255 | 255 |
| Zone 7, ° F. | 255 | 255 |
| Zone 8, ° F. | 255 | 255 |
| Zone 9, ° F. | 290 | 290 |
| Die Zone 1, ° F. | 290 | 290 |
| Screw Speed, RPM | — | 150 |
| % Load | — | 88 |
| Side Stuffer, RPM | — | 125 |
| Polymer Feeder, Dial | — | 156 |
| Fibril Feeder, Dial | — | 247 |
| Melt Temperature, ° F. | — | 344 |
| Head Pressure, psi | — | na |
| Rate, lbs/hr | — | 4.0 |

The strand was successfully extruded onto a conveyor belt, allowing for air cooling before being fed into a pelletizer. The material was easily pelletized with little evidence of brittleness caused by polymer degradation. At these conditions the product ran at steady state for over 2 hours before the run was terminated.

Example 3

BN carbon nanotube aggregates are added to the following epoxy precursors sold by Resolution Performance Products using a twin screw extruder:

Fusion Solids:

| GRADE | WEIGHT PER EPOXIDE[1] | MELT VISCOSITY[2] Poise | MELTING POINT °C. |
|---|---|---|---|
| 1002F | 600-700 | 12-25 | 80-90 |
| 1004F | 800-950 | 18 | 90-100 |
| 1007F | 1700-2300 | App. 500 | 120-130 |

[1]Test Method HC-427G or ASTM D-1652-97 (Perchloric Acid Method); grams or resin (solids basis) containing one gram-equivalent of epoxide. Perchloric acid titration methods vary depending upon resin.
[2]Test Method HC-710B or ASTM D-2196-86(1991)el at 150° C. (Viscosity by Brookfield Viscometer.

Powder Coating/Molding Powder Solids:

| GRADE | WEIGHT PER EPOXIDE[1] | MELT VISCOSITY[2] Poise | MELTING POINT °C. |
|---|---|---|---|
| 2002 | 675-760 | 20-40 | 80-90 |
| 2003 | 725-825 | 30-50 | 90-95 |
| 2004 | 875-975 | 70-120 | 95-105 |
| 2005 | 1200-1400 | >300 | 110-120 |
| 2012 | 510-570 | 20-35 | 80-90 |
| 2014 | 750-850 | 200-600 | 100-120 |
| 2024 | 850-950 | 60-120 | 95-105 |
| 2042 | 700-750 | 8-16 | 75-85 |

[1]Test Method HC-427G or ASTM D-1652-97 (Perchloric Acid Method); grams or resin (solids basis) containing one gram-equivalent of epoxide. Perchloric acid titration methods vary depending upon resin.
[2]Test Method HC-710B or ASTM D-2196-86(1991)el at 150° C. (Viscosity by Brookfield Viscometer.

Example 4

33 grams of 30% BN/Epon 1009F concentrate is prepared and combined with 24 grams of ethyl 3-ethoxy propionate ("e3ep") and 24 grams of xylene using a low shear mixer. This first mixture is aged for two days.

23 grams of virgin Epon 1009F is combined with 17 grams of e3ep, 17 grams of xylene, 29 grams of methylon 75202, 1.3 grams of SR 882M, 1.4 grams of 85% phosphoric acid and 10 grams of n-butanol to form a second mixture.

The two mixtures are combined to make a coating solution containing approximately 2.3% nanotubes by weight.

Example 5

The combined mixture in Example 4 above is diluted with more e3ep until the viscosity is 20 seconds as measured by a No. 4 Ford Cup to produce a product suitable for spray coating.

Example 6

33 grams of 30% BN/Epon 1009F concentrate is prepared and combined with 24 grams of ethyl 3-ethoxy propionate ("e3ep") and 24 grams of xylene using a low shear mixer to form a first mixture.

77 grams of $TiO_2$ and 23 grams of virgin Epon 1009F is combined with 17 grams of e3ep, 17 grams of xylene, 29 grams of methyl on 75202, 1.3 grams of SR 882M, 1.4 grams of 85% phosphoric acid and 10 grams of n-butanol to form a second mixture.

Both mixtures are aged for two days and then are combined to make a coating solution.

Example 7

Conductive thermosets containing carbon nanotubes can be used to form conductive bi-polar plate for use with fuel cells. For example, a desired conductive thermoset can comprise carbon nanotubes and a thermoset phenol formaldehyde or phenolic resin.

Cotton candy ("CC") fibril aggregates from Hyperion were mixed with a thermoset phenolic precursor (resin without the cross-linking additives). The resin precursor was in a powdered form that crystallized after sitting on the shelf. The resin precursor was run through a hammer mill in order to pulverize it back into a powder. Compounding trials were then run on the 27 mm Leistritz in both counter and co-rotating modes.

The first attempt at compounding this material was in counter rotating mode. The processing profile was as follows:

| RUN NUMBER(S) 10184 MODE Counter-rotating | | |
|---|---|---|
| PARAMETER | SET POINT | ACTUAL |
| Feed Zone, ° F. | 130 | 128 |
| Zone 1, ° F. | 170 | 170 |
| Zone 2, ° F. | 245 | 245 |
| Zone 3, ° F. | 245 | 245 |
| Zone 4, ° F. | 230 | 231 |
| Zone 5, ° F. | 230 | 231 |
| Zone 6, ° F. | 230 | 230 |
| Zone 7, ° F. | 215 | 215 |
| Zone 8, ° F. | 215 | 215 |
| Zone 9, ° F. | 210 | 210 |
| Die Zone 1, ° F. | 215 | 215 |
| Screw Speed, RPM | | 150 |
| % Load | | 71 |
| Side Stuffer, RPM | | 125 |
| Polymer Feeder, Dial | | 83 |
| Fibril Feeder, Dial | | 187 |
| Melt Temperature, ° F. | | 290 |
| Head Pressure, psi | | 150 |
| Rate, lbs/hr | | 5.0 |

The initial fibril concentration was 10%. The load on the motor was high at this loading, so the concentration was lowered to 5%. For reasons unknown, this experiment was not successful. Varying temperatures, screw speeds, and feed rates did not alleviate the problem. When the screws were pulled, uncompounded dry carbon was "caked" in the first mixing section after the carbon feed port. This may have been due to the improper screw design. In the counter rotation mode, no material samples were collected.

The mixing of carbon nanotubes in the thermoset precursor was then attempted in co-rotating mode. Carbon concentrations of 7 and 10 wt % were compounded with some success. The processing parameters were as follows:

| RUN NUMBER(S) 10185 MODE Co-rotating | | |
|---|---|---|
| PARAMETER | SET POINT | ACTUAL |
| Feed Zone, ° F. | 135 | 132 |
| Zone 1, ° F. | 150 | 150 |
| Zone 2, ° F. | 250 | 249 |
| Zone 3, ° F. | 250 | 250 |
| Zone 4, ° F. | 230 | 230 |
| Zone 5, ° F. | 230 | 230 |
| Zone 6, ° F. | 220 | 220 |
| Zone 7, ° F. | 210 | 210 |
| Zone 8, ° F. | 210 | 210 |
| Zone 9, ° F. | 220 | 220 |

-continued

| RUN NUMBER(S) 10185 MODE Co-rotating | | |
|---|---|---|
| PARAMETER | SET POINT | ACTUAL |
| Die Zone 1, ° F. | 240 | 238 |
| Screw Speed, RPM | | 175 |
| % Load | | 85 |
| Side Stuffer, RPM | | 125 |
| Polymer Feeder, Dial | | 97-96 |
| Fibril Feeder, Dial | | 116-157 |
| Melt Temperature, ° F. | | 75-86 |
| Head Pressure, psi | | 150-200 |
| Rate, lbs/hr | | 3.0 |

It was seen that even at these relatively low loadings and low throughputs, the load on the motor was high (between 75 and 86%). This result was somewhat surprising as the phenolic resin precursor has a very low viscosity in the molten state. In addition, the material recrystallized in the feed throat leading to an overload on the motor at one point.

A different grade of phenolic precursor such as one with a lower molecular weight and a narrower molecular weight distribution (i.e., lower concentration of the lower molecular weight fraction) may lead to better results on the theory that the low molecular weight tails are somehow reacting negatively with the carbon nanotubes during compounding.

Example 8

Conductive phenolic resin precursors were made with carbon nanotubes and a phenolic base resin precursor with a lower molecular weight but a narrower molecular weight distribution. It has been theorized that higher MW material (broader MW distribution) had a significant fraction of fringe material that was reacting negatively with the carbon. Therefore, by minimizing the fringe material, it was expected that the processability should be improved.

Phenolic base resin precursor and carbon nanotubes were compounded successfully at a concentration of 15 wt-% fibrils at the following conditions:

| RUN NUMBER(S) 10215 MODE Co-rotating | | |
|---|---|---|
| PARAMETER | SET POINT | ACTUAL |
| Feed Zone, ° F. | 75 | 101 |
| Zone 1, ° F. | 150 | 150 |
| Zone 2, ° F. | 250 | 250 |
| Zone 3, ° F. | 250 | 250 |
| Zone 4, ° F. | 230 | 230 |
| Zone 5, ° F. | 220 | 221 |
| Zone 6, ° F. | 210 | 210 |
| Zone 7, ° F. | 210 | 210 |
| Zone 8, ° F. | 210 | 210 |
| Zone 9, ° F. | 210 | 210 |
| Die Zone 1, ° F. | 220 | 222 |
| Screw Speed, RPM | | 150 |
| % Load | | 89 |
| Side Stuffer, RPM | | 125 |
| Polymer Feeder, Dial | | 82 |
| Fibril Feeder, Dial | | 226 |
| Melt Temperature, ° F. | | 260 |
| Head Pressure, psi | | 301 |
| Rate, lbs/hr | | 3.0 |

It has been discovered that phenolic resin precursors with narrower MWD resulted in better compounding of carbon nanotubes.

Example 9

A ten pound sample was made with the lower viscosity (narrow molecular weight distribution) phenolic resin precursor. The sample contained 15 wt-% CC fibrils.

The masterbatch was processed at the following conditions:

| RUN NUMBER(S) 10237 MODE Co-rotating | | |
|---|---|---|
| PARAMETER | SET POINT | ACTUAL |
| Feed Zone, ° F. | 75 | 102 |
| Zone 1, ° F. | 150 | 150 |
| Zone 2, ° F. | 240 | 240 |
| Zone 3, ° F. | 240 | 240 |
| Zone 4, ° F. | 220 | 220 |
| Zone 5, ° F. | 220 | 220 |
| Zone 6, ° F. | 210 | 210 |
| Zone 7, ° F. | 210 | 210 |
| Zone 8, ° F. | 210 | 212 |
| Zone 9, ° F. | 210 | 210 |
| Die Zone 1, ° F. | 220 | 222 |
| Screw Speed, RPM | | 150 |
| % Load | | 80 |
| Side Stuffer, RPM | | 125 |
| Polymer Feeder, Dial | | 2.55 |
| Fibril Feeder, Dial | | 226 |
| Melt Temperature, ° F. | | 302 |
| Head Pressure, psi | | 150 |
| Rate, lbs/hr | | 3.0 |

Example 10

Carbon nanotube was combined with phenolic resin precursor of an even lower molecular weight distribute than Example 9 on the 27 mm Leistritz.

The carbon nanotubes were fed through the side stuffer on the 27 mm Leistritz at the following conditions:

| RUN NUMBER(S) 10350 MODE Co-rotating | | |
|---|---|---|
| PARAMETER | SET POINT | ACTUAL |
| Feed Zone, ° F. | 75 | 118 |
| Zone 1, ° F. | 150 | 150 |
| Zone 2, ° F. | 230 | 231 |
| Zone 3, ° F. | 230 | 230 |
| Zone 4, ° F. | 190 | 190 |
| Zone 5, ° F. | 190 | 191 |
| Zone 6, ° F. | 180 | 180 |
| Zone 7, ° F. | 180 | 180 |
| Zone 8, ° F. | 180 | 181 |
| Zone 9, ° F. | 180 | 179 |
| Die Zone 1, ° F. | 200 | 201 |
| Screw Speed, RPM | | 150 |
| % Load | | 82 |
| Side Stuffer, RPM | | 125 |
| Polymer Feeder, Dial | | 139 |
| Fibril Feeder, Dial | | 250 |
| Melt Temperature, ° F. | | 260 |
| Head Pressure, psi | | 260 |
| Rate, lbs/hr | | 3.0 |

It has been discovered that phenolic resin precursors with a very narrow molecular weight distribution did not compound with carbon nanotube as smoothly as the phenolic resin precursor of Examples 8 and 9. The feed throat would continually need to be cleaned out manually in order to prevent bridging. Also, from an aesthetic point of view, the extrudate was not as good as the sample made in Examples 8 and 9. Approximately 10 pounds were collected.

Example 11

The conductive phenolic resin precursors of Examples 8 and 9 are made into plates for use in fuel cells. Electrical resistivity (surface resistance in ohm/sq) below 50 ohm/sq., preferably 10-20 ohm/sq is sought.

Example 12

Bird nest fibril aggregates ("BN") was combined with phenolic resin precursor using the procedure as described in Example 8.

The masterbatch was successfully produced at the following conditions:

| RUN NUMBER(S) 10514 thru 10517 MODE Co-rotating | | |
|---|---|---|
| PARAMETER | SET POINT | ACTUAL |
| Feed Zone, ° F. | 110 | 113 |
| Zone 1, ° F. | 150 | 150 |
| Zone 2, ° F. | 240 | 239 |
| Zone 3, ° F. | 240 | 240 |
| Zone 4, ° F. | 220 | 219 |
| Zone 5, ° F. | 220 | 219 |
| Zone 6, ° F. | 210 | 210 |
| Zone 7, ° F. | 210 | 210 |
| Zone 8, ° F. | 210 | 210 |
| Zone 9, ° F. | 210 | 210 |
| Die Zone 1, ° F. | 230 | 228 |
| Screw Speed, RPM | | 127 |
| % Load | | 75 |
| Side Stuffer, RPM | | 125 |
| Polymer Feeder, Dial | | 079 |
| Fibril Feeder, Dial | | 187 |
| Melt Temperature, ° F. | | 260 |
| Head Pressure, psi | | — |
| Rate, lbs/hr | | 3.0 |

Fifty (50) pounds were collected.

Example 13

Carbon nanotubes was mixed with EPON 1009, a known epoxy precursor, using an extrusion process to form a conductive epoxy precursor containing 15% carbon nanotubes by weight and having a melting point of 140° C. The conductive epoxy precursor was ground fine enough so as to pass through a #20 sieve.

A liquid or gel-like diluting agent, EPON 828, was mixed in or added to the conductive epoxy precursor in varying amounts. The conductive epoxy precursor was heated to 150° C., then 170° C. to facilitate the mixing. Initial attempts to mix in the EPON 828 using a planetary mixer with low shear rate (Ross Mixers, Hauppauge, N.Y.) were not successful. Subsequent attempts to mix in the EPON 828 using a multi shaft mixer with greater shear rate, VersaMix (VM) (Ross Mixers, Hauppauge, N.Y.) were successful. Samples 1-13 were prepared. Sample 11 was prepared by adding more EPON 828 to Sample 10, which appeared more viscous than the VersaMix could mix homogenously. Samples 1-12 were withdrawn and additional ground conductive epoxy precursor was added during several hours of processing at temperature. Sample 13 was made as a single, uninterrupted batch.

| Sample No. | EPON 828 (g) | EPON 1009 (g) | CNT (g) | CNT (%) | Total (g) | WPE* |
|---|---|---|---|---|---|---|
| 1 | 5493 | 333 | 59 | 1.00 | 5885 | 199 |
| 2 | 5493 | 690 | 122 | 1.93 | 6305 | 210 |
| 3 | 5252 | 660 | 116 | 1.93 | 6028 | 210 |
| 4 | 5002 | 628 | 111 | 1.93 | 5742 | 210 |
| 5 | 5002 | 1087 | 192 | 3.05 | 6282 | 226 |
| 6 | 4802 | 1044 | 184 | 3.05 | 6030 | 226 |
| 7 | 4802 | 1514 | 267 | 4.06 | 6583 | 242 |
| 8 | 4573 | 1442 | 254 | 4.05 | 6269 | 242 |
| 9 | 4573 | 2003 | 353 | 5.10 | 6929 | 263 |
| 10 | 4401 | 1927 | 340 | 5.10 | 6669 | 263 |
| 11 | 6126 | 1927 | 340 | 4.05 | 8394 | 242 |
| 12 | 5915 | 1861 | 328 | 4.05 | 8105 | 242 |
| 13 | 5448 | 1182 | 209 | 3.05 | 6839 | 226 |

*WPE = Weight per Epoxy Equivalent.

The materials are all viscous, with the higher levels bordering on solids at room temperature.

Example 14

Selected samples of conductive epoxy precursor from Example 13 were blended with a second epoxy precursor, Epi-cure 3234 curing agent, to form the conductive epoxy and the resistivity of the cured specimens were measured. Both the conductive epoxy precursor samples, which were viscous, and Epi-cure 3234, which is a tri-amine liquid at room temperature, was heated in order to accelerate curing. EpiCure 3234 was added by stoichiometry based on WPE and was approximately 11% by weight.

In addition, conductive epoxy precursors in which EPON 828 was added or mixed in with either a Waring blender (WB) or with sonication (SON) are also included. These samples are labeled H1-H7.

Most of the conductive epoxy samples were prepared by adding the conductive epoxy precursor and the Epi-cure 3234 to a zip-lock PE bag, warmed on an 80° C. hotplate, and mixed with a hand roller. The mixed sample was squeezed from the PE bag onto a PTFE sheet and covered with a weighted piece of PTFE to form a flat, cured specimen. Curing was either in an oven, on a hot plate or in the Carver press with heated platens. Small pieces of the cured conductive epoxy were cut, opposing surfaces sanded and coated with Ag paint. Resistance was measured with a DMM (digital multimeter).

To investigate the possible effect of curing temperature, a sample of Sample 6 and Epi-cure 3234 was warmed to ~60° C., mixed with the roller and then split into 3 parts with one part cured at room temperature (6-RT), one at 80° C. on the hot plate (6-HP) and the third at 116° C. in the Carver press (6-CP). The 6-RT room temperature sample was very brittle and its resistance was off scale on the DMM (limit 2E7 ohms). In another experiment, another 6-RT sample prepared from the first two rolls of a three roll mill. The resulting sample was also very brittle and its resistance off scale on the DMM. Even though Ag paint was used, contact resistance may have been an issue.

Data for the resistivity experiment is summarized below:

| Sample No. | CC CNT (%) | Let Down Mixing Method | Mixing Temp (°C.) | Resistance (OHMS) | Length (in) | Height (in) | Width (in) | Resistivity (Ohm-cm) | Cure Temp (°C.) |
|---|---|---|---|---|---|---|---|---|---|
| H1 | 2 | WB | 170 | 5.50E+05 | 0.795 | 0.055 | 0.3 | 2.90E+04 | 80 |
| H2 | 2 | SON | 150 | 3.00E+05 | 0.775 | 0.055 | 0.26 | 1.40E+04 | 80 |
| H3 | 2 | WB | 150 | 7.60E+05 | 0.825 | 0.036 | 0.29 | 2.40E+04 | 80 |
| H4 | 2 | SON | ~100 | 2.50E+05 | 0.57 | 0.065 | 0.3 | 2.20E+04 | 80 |
| H5 | 1 | SON | ~100 | 1.17E+06 | 0.38 | 0.035 | 0.23 | 6.30E+04 | 80 |
| H6 | 1.2 | WB | ~100 | 1.53E+06 | 0.46 | 0.045 | 0.25 | 9.50E+04 | 80 |
| H7 | 3 | WB | 160 | 1.20E+06 | 0.595 | 0.02 | 0.28 | 2.90E+04 | 100 |
| 3-1 | 2 | VM | 150-170 | >2e7 | | | | | 80 |
| 3-2 | 2 | VM | 150-170 | >2e7 | | | | | 80 |
| 4-1 | 2 | VM | 150-170 | >2e7 | | | | | 80 |
| 4-2 | 2 | VM | 150-170 | >2e7 | | | | | 80 |
| 4-Disk | 2 | VM | 150-170 | 1.98E+06 | 0.62 | 0.04 | 0.8 | 2.60E+05 | 80 |
| 4-Rect | 2 | VM | 150-170 | 1.29E+06 | 1.53 | 0.125 | 0.82 | 2.20E+05 | 80 |
| 3 | 2 | VM | 150-170 | 1.19E+05 | 0.09 | 0.375 | 0.46 | 5.79E+05 | 120 |
| 6-1 | 3 | VM | 150-170 | 2.71E+06 | 0.325 | 0.0105 | 0.195 | 4.30E+04 | 80 |
| 6-2 | 3 | VM | 150-170 | 1.74E+06 | 0.45 | 0.013 | 0.19 | 2.40E+04 | 80 |
| 6 | 3 | VM | 150-170 | 4.05E+06 | 1.765 | 0.14 | 0.45 | 3.67E+05 | 120 |
| 12 | 4 | VM | 150-170 | 2.00E+02 | 0.488 | 0.132 | 0.081 | 1.10E+01 | 100 |
| 12 | 4 | VM | 150-170 | 5.30E+05 | 0.38 | 0.0165 | 0.161 | 9.40E+03 | 100 |
| 7 | 4 | VM | 150-170 | 3.30E+03 | 0.065 | 0.41 | 0.42 | 2.22E+04 | 120 |
| 11 | 4 | VM | 150-170 | 4.93E+04 | 0.065 | 0.495 | 0.478 | 4.56E+05 | 120 |
| 6-RT | 3 | VM | 150-170 | >2e7 | 0.038 | | | | 20 |
| 6-HP | 3 | VM | 150-170 | 9.88E+03 | 0.038 | 0.315 | 0.325 | 6.8E+04 | 80 |
| 6-CP | 3 | VM | 150-170 | 9.70E+05 | 0.038 | 0.37 | 0.36 | 8.6E+06 | 116 |
| 6-RM | 3 | VM | 150-170 | >2e7 | 0.038 | | | | 20 |

*CNT % was calculated prior to addition of the curing agent. The WPE of EPON 828 is 188 and the WPE of EPON 1009F used for calculations was 3000.

The above example confirmed that cured epoxies with ESD levels of conductivity can be obtained by letting down a conductive epoxy precursor with a diluting agent to loading levels of ~1-4%.

The terms and expressions which have been employed are used as terms of description and not of limitations, and there is no intention in the use of such terms or expressions of excluding any equivalents of the features shown and described as portions thereof, it being recognized that various modifications are possible within the scope of the invention.

We claim:

1. A method of preparing a thermoset precursor comprising:
   providing a thermoset precursor having a viscosity greater than 15 poise; and
   extruding carbon nanotubes with said thermoset precursor.
2. The method of claim 1, wherein said carbon nanotubes have a diameter less than 1 micron.
3. The method of claim 1, wherein said thermoset precursor is an epoxy precursor, phenolic precursor, polyimide precursor, urethane precursor, polyester precursor, vinyl ester precursor or silicone precursor.
4. The method of claim 1, wherein said thermoset precursor has a viscosity of 20 to 600 poise.
5. The method of claim 1, wherein said carbon nanotubes are present in an amount of 0.5 to 40% by weight.
6. The method of claim 1, wherein said extruding comprises use of a twin screw extruder.
7. The method of claim 1, further comprising milling said thermoset precursor.
8. The method of claim 7, wherein said milling comprises use of a three roll mill.
9. A thermoset precursor formed by the method of claim 1.
10. A thermoset formed with the thermoset precursor of claim 9.
11. The thermoset of claim 10, wherein said thermoset has a resistivity of less than $10^{11}$ ohm-cm.

* * * * *